(12) United States Patent
Nishimura (10) Patent No.: US 11,143,825 B2
(45) Date of Patent: Oct. 12, 2021

(54) FERRULE, OPTICAL-FIBER-EQUIPPED FERRULE, AND METHOD FOR MANUFACTURING FERRULE

(71) Applicant: FUJIKURA LTD., Tokyo (JP)

(72) Inventor: Akito Nishimura, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/640,074

(22) PCT Filed: Oct. 17, 2017

(86) PCT No.: PCT/JP2017/037561
§ 371 (c)(1),
(2) Date: Feb. 19, 2020

(87) PCT Pub. No.: WO2019/077681
PCT Pub. Date: Apr. 25, 2019

(65) Prior Publication Data
US 2021/0132303 A1    May 6, 2021

(51) Int. Cl.
*G02B 6/40* (2006.01)
*G02B 6/38* (2006.01)
*G02B 6/42* (2006.01)

(52) U.S. Cl.
CPC .......... *G02B 6/406* (2013.01); *G02B 6/3825* (2013.01); *G02B 6/3833* (2013.01); *G02B 6/3885* (2013.01); *G02B 6/4214* (2013.01); *G02B 6/3839* (2013.01)

(58) Field of Classification Search
CPC .. G02B 6/3825; G02B 6/3833; G02B 6/3885; G02B 6/406; G02B 6/4214
See application file for complete search history.

(56) References Cited

U.S. PATENT DOCUMENTS

| 4,950,048 | A | * | 8/1990 | Kakii | .................. G02B 6/3821 385/83 |
| 5,339,376 | A |   | 8/1994 | Kakii et al. | |
| 5,414,786 | A | * | 5/1995 | Ohta | ....................... G02B 6/30 385/129 |
| 6,826,832 | B2 | * | 12/2004 | Takada | ................ G02B 6/3833 29/857 |

(Continued)

FOREIGN PATENT DOCUMENTS

| CN | 1768284 A | 5/2006 |
| JP | S62-276514 A | 12/1987 |

(Continued)

OTHER PUBLICATIONS

International Search Report issued in corresponding International Application No. PCT/JP2017/037561 dated Jan. 23, 2018 (2 pages).

*Primary Examiner* — Daniel Petkovsek
(74) *Attorney, Agent, or Firm* — Osha Bergman Watanabe & Burton LLP (57) ABSTRACT

A ferrule with fiber holes includes: a resin-molded portion molded by a resin; and a reinforcement member embedded in the resin-molded portion and that has a smaller linear expansion coefficient than the resin-molded portion. The reinforcement member includes fiber insertion portions that are parallel to the fiber holes. The fiber holes are formed by the resin that entered the fiber insertion portions.

6 Claims, 8 Drawing Sheets

(56) References Cited

U.S. PATENT DOCUMENTS

| | | | |
|---|---|---|---|
| 2003/0016999 A1 | 1/2003 | Jones | |
| 2004/0114859 A1 | 6/2004 | Colgan et al. | |
| 2006/0245694 A1* | 11/2006 | Chen | G02B 6/32 385/71 |
| 2009/0092362 A1* | 4/2009 | Mizue | G02B 6/4292 385/92 |
| 2016/0282568 A1* | 9/2016 | Nishimura | G02B 6/3814 |

FOREIGN PATENT DOCUMENTS

| | | |
|---|---|---|
| JP | S63-104007 A | 5/1988 |
| JP | H01-125409 U | 8/1989 |
| JP | H03-179406 A | 8/1991 |
| JP | H04-098207 A | 3/1992 |
| JP | H04-352109 A | 12/1992 |
| JP | H08-338925 A | 12/1996 |
| JP | H09-54224 A | 2/1997 |
| JP | H09-133841 A | 5/1997 |
| JP | 2005-134528 A | 5/2005 |
| JP | 2008-015301 A | 1/2008 |
| JP | 2009-258510 A | 11/2009 |
| JP | 2013-041262 A | 2/2013 |
| JP | 2013-80264 A | 5/2013 |
| KR | 101166804 B1 | 7/2012 |

\* cited by examiner

FIG. 4A (FIRST MODIFIED EXAMPLE)

FIG. 4B

FIG. 5A (SECOND MODIFIED EXAMPLE)

FIG. 5B

FIG. 6A (THIRD MODIFIED EXAMPLE)

FIG. 6B

FIG. 7A (SECOND EMBODIMENT)

FIG. 7B

FIG. 8A (THIRD EMBODIMENT)

FERRULE, OPTICAL-FIBER-EQUIPPED FERRULE, AND METHOD FOR MANUFACTURING FERRULE

TECHNICAL FIELD

The present invention relates to a ferrule, a ferrule equipped with optical fibers, and a method for manufacturing a ferrule.

BACKGROUND

Patent Literature 1 discloses a technique of embedding a reinforcement member made of an ultrahard alloy having a small linear expansion coefficient, with the aim of preventing axial misalignment among fiber holes (optical fiber insertion holes) caused by contraction of an optical connector ferrule, which is a resin-molded article. In Patent Literature 1, the reinforcement member is arranged so as to surround the plurality of fiber holes.

Patent Literatures 2 and 3 also disclose techniques of arranging a reinforcement member so as to surround a plurality of fiber holes.

PATENT LITERATURE

Patent Literature 1: Japanese Patent Application Laid-open Publication H08-338925A Patent Literature 2: Japanese Patent Application Laid-open Publication H04-98207A Patent Literature 3: Japanese Utility Model Application Laid-open Publication JP H01-125409U In Patent Literatures 1 to 3, the plurality of fiber holes are formed by resin molding inside a rectangular-tubular reinforcement member. According to this structure, because the linear expansion coefficient of the resin inside the reinforcement member is large, positional misalignment may occur among the fiber holes inside the reinforcement member in cases where the resin inside the reinforcement member expands/contracts due to temperature changes, for example.

To suppress positional misalignment among the fiber holes caused by temperature changes, one may contemplate forming the fiber holes in the reinforcement member itself. It is, however, difficult to form a plurality of fiber holes with high accuracy (with positional and dimensional accuracy as high as that when forming the holes by resin molding) in a reinforcement member made of a low-linear-expansion material, thus, after all, resulting in positional misalignment among the fiber holes.

SUMMARY

One or more embodiments of the present invention provide a ferrule in which the positional accuracy of fiber holes is improved.

Embodiments of the present invention relate to a ferrule including a plurality of fiber holes. The ferrule includes: a resin-molded portion that is molded by a resin; and a reinforcement member that is embedded in the resin-molded portion and has a smaller linear expansion coefficient than the resin-molded portion. The reinforcement member includes a plurality of fiber insertion portions that are parallel to the fiber holes. The fiber holes are formed by the resin that has entered inside the fiber insertion portions.

Other features of one or more embodiments of the present invention are revealed by the following description and drawings.

According to one or more embodiments of the present invention, the positional accuracy of fiber holes can be improved.

DETAILED DESCRIPTION

At least the following features are disclosed in the following description and drawings.

Disclosed is a ferrule including a plurality of fiber holes, the ferrule including: a resin-molded portion that is molded by a resin; and a reinforcement member that is embedded in the resin-molded portion and has a smaller linear expansion coefficient than the resin-molded portion. The reinforcement member includes a plurality of fiber insertion portions that are parallel to the fiber holes. The fiber holes are formed by the resin that has entered inside the fiber insertion portions. With this ferrule, the positional accuracy of the plurality of fiber holes can be improved.

Each of the fiber insertion portions is a through hole; and the fiber holes are formed by the resin that has entered inside the through holes. In this way, the inner wall of each of the fiber insertion portions can be arranged so as to surround the respective fiber holes, and thus, positional misalignment among the fiber holes caused by temperature changes can be suppressed.

Each of the fiber insertion portions is formed in a groove shape; and the fiber holes are formed by the resin that has entered inside the groove-shaped fiber insertion portions. In this way, the fiber insertion portions can be formed easily.

The reinforcement member includes a first reinforcing member including the plurality of groove-shaped fiber insertion portions, and a flat-shaped second reinforcing member; and the fiber holes are formed by the resin that has entered inside a region surrounded by the fiber insertion portions and the second reinforcing member. In this way, the ferrule can be suppressed from deforming and warping.

The first reinforcing member and the second reinforcing member are in contact with one another. In this way, the first reinforcing member and the second reinforcing member can be set easily in a resin molding device at the time of resin molding.

The ferrule includes a plurality of lens portions constituted by the resin-molded portion. In this way, signal loss can be suppressed.

The ferrule includes a reflection surface constituted by the resin-molded portion. In this way, the optical path can be changed.

The reflection surface is sloped with respect to the direction of the fiber holes; and an end surface of the reinforcement member on the reflection surface side is sloped in the same direction as the reflection surface. In this way, the reinforcement member can be arranged close to the reflection surface.

The resin-molded portion and the reinforcement member are each made of a UV-transmissive material. In this way, a UV-curable resin can be irradiated with UV rays through the resin-molded portion and the reinforcement member.

Also disclosed is a ferrule-equipped fiber including: a ferrule including a plurality of fiber holes; and an optical fiber inserted in the fiber hole. The ferrule includes: a resin-molded portion that is molded by a resin; and a reinforcement member that is embedded in the resin-molded portion and has a smaller linear expansion coefficient than the resin-molded portion. The reinforcement member includes a plurality of fiber insertion portions that are parallel to the fiber holes. The fiber holes are formed by the resin that has entered inside the fiber insertion portions. With this ferrule-equipped fiber, the positional accuracy of fiber holes can be improved.

Also disclosed is a method for manufacturing a ferrule including a plurality of fiber holes, the method involving: setting, in a molding device, a reinforcement member that includes a plurality of fiber insertion portions and has a smaller linear expansion coefficient than a resin-molded portion of the ferrule; and molding, with the molding device, the resin-molded portion by embedding the reinforcement member by a resin, and forming the fiber holes parallel to the fiber insertion portions by causing the resin to enter inside the fiber insertion portions. With this manufacturing method, it is possible to manufacture a ferrule in which the positional accuracy of fiber holes is improved.

Figure 1A:
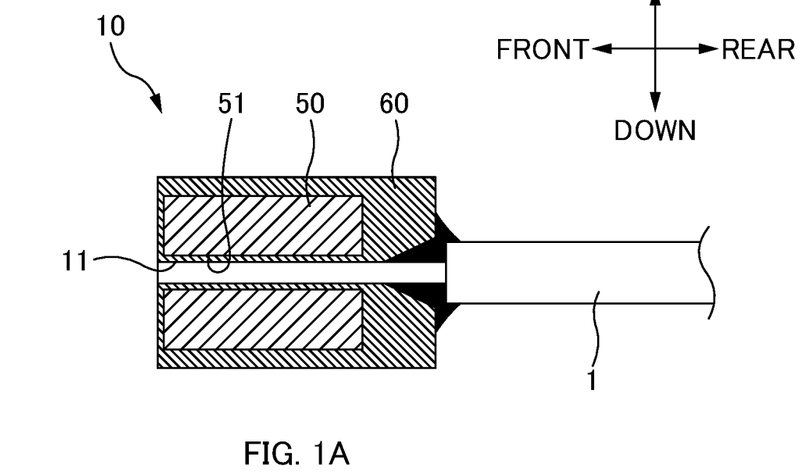
FIG. 1A is a cross-sectional view of a ferrule 10 (ferrule-equipped fiber) according to one or more embodiments.
Figure 1B:
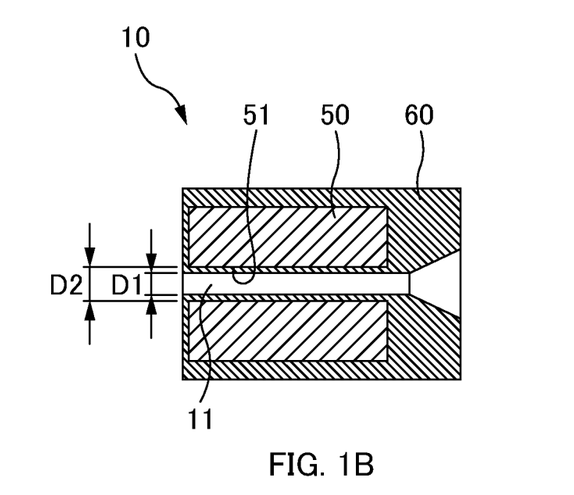
FIG. 1B is a cross-sectional view of the ferrule 10 of the one or more embodiments.
Figure 2A:
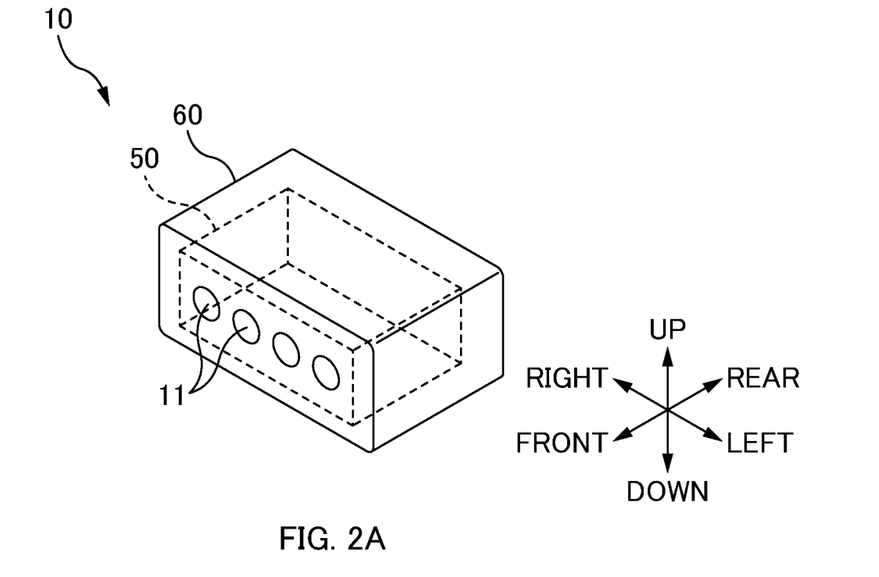
FIG. 2A is an overall perspective view of the ferrule 10 of the one or more embodiments.
Figure 2B:
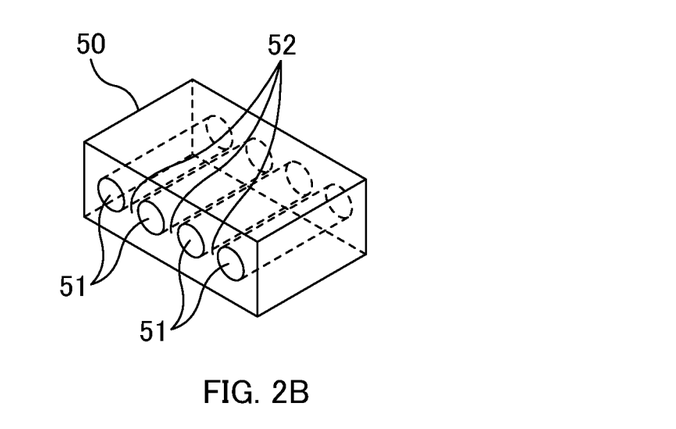
FIG. 2B is a perspective view of a reinforcement member 50 embedded inside the ferrule 10 of the first embodiment.

FIG. 1A is a cross-sectional view of a ferrule 10 (ferrule-equipped fiber) according to one or more embodiments. FIG. 1B is a cross-sectional view of the ferrule 10 of one or more embodiments. FIG. 2A is an overall perspective view of the ferrule 10 of one or more embodiments. FIG. 2B is a perspective view of a reinforcement member 50 embedded inside the ferrule 10 of one or more embodiments.

In the following description, the various directions are defined as illustrated in FIGS. 1A and 2A. More specifically, the direction of fiber holes 11 in the ferrule 10 (i.e., the optical axis direction of optical fibers 1) is defined as the "front-rear direction", wherein the end surface side of the optical fibers 1 is the "front" whereas the opposite side (i.e., the side toward which the optical fibers 1 extend out from the ferrule 10) is the "rear". The direction in which the plurality of fiber holes 11 are lined up is defined as the "left-right direction". The thickness direction of the ferrule 10 is defined as the "up-down direction".

The ferrule 10 is a member that retains the end portion of each optical fiber 1. The ferrule 10 includes a plurality of fiber holes 11 (four in this example).

The fiber hole 11 is a hole in which the end portion of an optical fiber 1 is inserted. The fiber hole 11 also serves as a hole for positioning the optical fiber 1. A bare optical fiber, exposed by removing the jacket/cladding from a jacketed optical fiber, will be inserted into the fiber hole 11. Thus, the fiber hole 11 serves as a section forming an optical path inside the ferrule 10. Each fiber hole 11 is formed parallel to the front-rear direction. The plurality of fiber holes 11 are parallel to one another and are lined up in the left-right direction.

In one or more embodiments, each fiber hole 11 is formed as a through hole that penetrates the ferrule 10 between the front-side end surface and the rear-side end surface. Thus, a plurality of fiber holes 11 are opened in the front-side end surface of the ferrule 10. Also, a plurality of fiber holes 11 are opened in the rear-side end surface of the ferrule 10. The rear-side openings serve as fiber insertion openings 12 through which the optical fibers 1 are inserted into the respective fiber holes 11. The optical fibers 1 inserted in the respective fiber holes 11 are bonded and fixed to the ferrule 10, and then their respective end surfaces are polished together with the front-side end surface of the ferrule 10.

The number of fiber holes 11 is not limited to four, and may be any other number. In the ferrule 10 illustrated in the figures, the plurality of fiber holes 11 are lined up in a single row, but the number of rows of fiber holes 11 is not limited to one, and there may be two or more rows.

The ferrule 10 of one or more embodiments is a resin-molded article including a reinforcement member 50, as illustrated in FIG. 2B, embedded therein. Stated differently, the ferrule 10 of one or more embodiments includes a reinforcement member 50, and a resin-molded portion 60 in which the reinforcement member 50 is embedded.

The reinforcement member 50 is a member having a small linear expansion coefficient, and is a member that suppresses the expansion/contraction of the resin-molded portion 60. The reinforcement member 50 has a smaller linear expansion coefficient than a resin constituting the resin-molded portion 60. In one or more embodiments, the reinforcement member 50 is made of UV-transmissive glass.

The material for the reinforcement member 50 is not limited to glass, and it is possible to use, for example, ceramic materials such as zirconia or alumina, metal materials such as ultrahard alloys, or silicon. The material of the reinforcement member 50 is the same as the material of an object to which the ferrule 10 is to be connected, or a material having a similar linear expansion coefficient as the material of an object to which the ferrule 10 is to be connected. The difference between the linear expansion coefficient of the reinforcement member 50 and the linear expansion coefficient of an object to which the ferrule 10 is to be connected is smaller than the difference between the linear expansion coefficient of the resin-molded portion 60 and the linear expansion coefficient of an object to which the ferrule 10 is to be connected. For example, in cases where the object to which the ferrule 10 is to be connected is made of glass, the reinforcement member 50 is also made of glass.

The reinforcement member 50 includes a plurality of fiber insertion portions 51. The fiber insertion portion 51 is a section through which the respective optical fiber 1 is inserted and passed, and each fiber hole 11 of the ferrule 10 is formed along the respective fiber insertion portion 51.

Thus, the fiber insertion portions 51 are parallel to the fiber holes 11 and parallel to the front-rear direction. The plurality of fiber insertion portions 51 are parallel to one another and are lined up in the left-right direction.

In one or more embodiments, each fiber insertion portion 51 is formed as a through hole that penetrates the reinforcement member 50 between the front-side end surface and the rear-side end surface. Stated differently, the reinforcement member 50 of one or more embodiments is a glass capillary having a plurality of through holes. By forming the fiber insertion portions 51 as through holes, the inner wall of each fiber insertion portion 51 can be arranged so as to surround the respective fiber hole 11, and thus, it is possible to suppress positional misalignment among the fiber holes 11 caused by temperature changes.

The diameter D2 of the fiber insertion portion 51 is larger than the diameter D1 (approximately 125 μm) of the fiber hole 11 by around several micrometers to several tens of micrometers. In this way, the fiber holes 11 can be arranged within the respective fiber insertion portions 51, even if the fiber insertion portions 51 cannot be formed with high accuracy (with positional and dimensional accuracy as high as resin molding) in the reinforcement member 50, which is made of a low-linear-expansion material. Stated differently, the diameter D2 of the fiber insertion portion 51 is made larger than that of the fiber hole 11, taking into consideration processing errors arising when forming the fiber insertion portions 51 in the reinforcement member 50, which is made of a low-linear-expansion material.

The length, in the front-rear direction, of the fiber insertion portion 51 is at least 10 times the diameter of the optical fiber 1 (approximately 125 μm). This is because, if the length of the fiber insertion portion 51 in the front-rear direction is too short, the resin-molded portion 60 on the rear side of the reinforcement member 50 may expand/contract due to temperature changes and the fiber holes 11 on the rear side of the reinforcement member 50 may deform and thereby cause the optical fibers 1 to bend, in which case positional misalignment may occur among the respective end surfaces of the optical fibers 1. In one or more embodiments, the length of the fiber insertion portion 51 in the front-rear direction is approximately 2 mm.

The reinforcement member 50 includes partitioning wall portions 52. The partitioning wall portions 52 are partitioning walls for partitioning the fiber insertion portions 51. Each partitioning wall portion 52 is arranged between one fiber insertion portion 51 and another fiber insertion portion 51. Because the partitioning wall portions 52, which are made of a material having a low linear expansion coefficient (glass in one or more embodiments), are arranged between the fiber insertion portions 51, 51, it is possible to suppress positional misalignment among the fiber holes 11 caused by temperature changes.

The resin-molded portion 60 is a section molded by a resin. The reinforcement member 50 is embedded in the resin-molded portion 60. In one or more embodiments, the entire reinforcement member 50 is embedded in the resin-molded portion 60, but instead, a portion of the reinforcement member 50 may be exposed.

The aforementioned fiber holes 11 are constituted by the resin-molded portion 60. More specifically, the fiber holes 11 are formed in the resin-molded portion 60 by the resin entering inside the respective fiber insertion portions 51 having a larger outer diameter. Stated differently, the inner wall surface of each fiber hole 11 is formed by the resin constituting the resin-molded portion 60. The processing precision in resin molding is higher than the processing precision with respect to materials with low linear expansion coefficients, such as glass. Thus, by forming the fiber holes 11 in the resin-molded portion 60 (i.e., by forming the fiber holes 11 by resin molding), the diameter and positioning of the fiber holes 11 can be set with high accuracy.

In ordinary cases (in cases where there is no reinforcement member 50), if the plurality of fiber holes 11 are formed by a resin, positional misalignment may occur among the fiber holes 11 due to temperature changes, because the linear expansion coefficient of resin is relatively high. In contrast, according to one or more embodiments: a plurality of fiber insertion portions 51 are formed in the reinforcement member 50 which has a low linear expansion coefficient; the fiber holes 11 are formed respectively inside the fiber insertion portions 51; and the thickness of the resin layer inside each fiber insertion portion 51 (i.e., the dimension from the inner wall surface of the fiber insertion portion 51 to the inner wall surface of the fiber hole 11, which is from around several micrometers to several tens of micrometers in this example) is thin. Thus, it is possible to suppress positional misalignment among the fiber holes 11 caused by temperature changes.

By arranging the reinforcement member 50 in a mold chamber at the time of resin molding, the reinforcement member can be formed (by insert molding) so as to be embedded in the resin-molded portion 60. Examples of resin molding methods that may be used include RIM molding and transfer molding.

In one or more embodiments, at the time of resin molding, it is necessary to make the resin enter a gap of around several micrometers to several tens of micrometers inside each fiber insertion portion 51 of the reinforcement member 50 to form the fiber holes 11. In order to allow the resin to enter such a narrow gap, a resin with a relatively low viscosity (melt viscosity; viscosity when a thermosetting resin is plasticized) is used. More specifically, the viscosity of the resin is 2400 Pa·s or less, or 100 Pa·s or less.

In one or more embodiments, the resin-molded portion 60 is made of a UV-transmissive resin. By constituting the reinforcement member 50 and the resin-molded portion 60 by UV-transmissive members, the optical fibers 1 can be bonded and fixed to the respective fiber holes 11 by using a UV-curable resin. Note that, in cases of making the resin-molded portion 60 out of a UV-transmissive resin, the choices of materials for the resin-molded portion 60 are limited, and therefore, the resin-molded portion 60 may be made out of a material having a relatively large linear expansion coefficient. In such cases, it is advantageous to provide the reinforcement member 50 in the ferrule 10.

Figure 3:
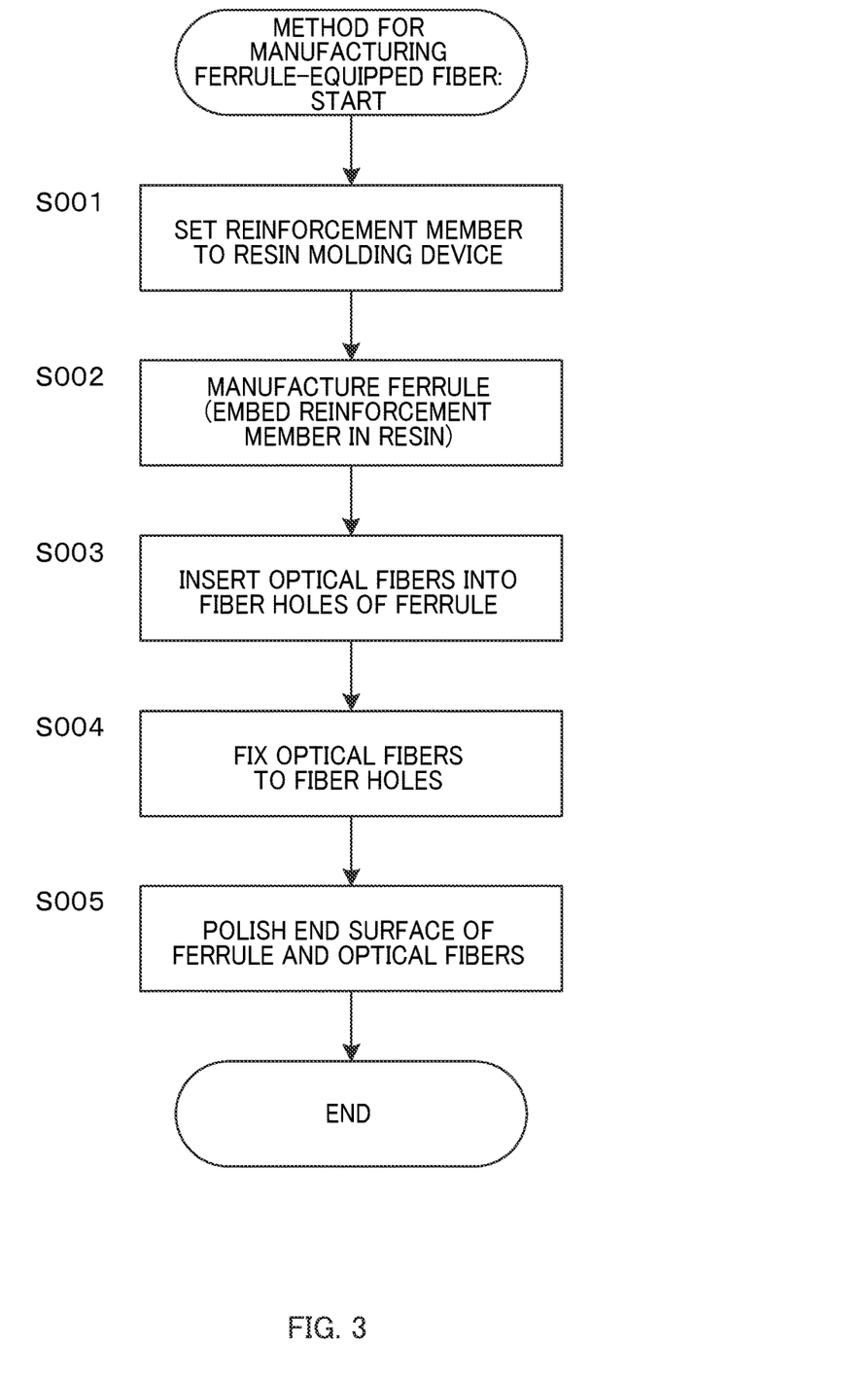
FIG. 3 is a flowchart illustrating a method for manufacturing a ferrule-equipped fiber.

Manufacturing Method:

FIG. 3 is a flowchart illustrating a method for manufacturing a ferrule-equipped fiber.

First, a process is performed for setting a reinforcement member 50 to a resin molding device (S001). The reinforcement member 50 will be arranged inside a mold chamber of the resin molding device.

Next, a process is performed for manufacturing a ferrule 10 (S002). In this process, a resin is injected into the mold chamber of the resin molding device, and thereby, a resin-molded portion 60 in which the reinforcement member 50 is embedded is formed. The resin also enters inside the fiber insertion portions 51 of the reinforcement member 50, and thereby, fiber holes 11 are formed inside the respective fiber insertion portions 51.

The resin entering inside the fiber insertion portions 51 enters from the side which becomes the front-side end surface of the ferrule 10. Stated differently, the mold of the resin molding device is configured such that the resin enters inside the fiber insertion portions 51 from the side which becomes the front-side end surface of the ferrule 10. In this way, the positional accuracy of the fiber holes 11 in the front-side end surface of the ferrule 10 (i.e., the fiber holes 11 close to the end surface of the respective optical fibers 1) can be improved, and thus, transmission loss of optical signals can be reduced.

The ferrule 10 illustrated in FIG. 1B is manufactured by the aforementioned steps S001 and S002. The ferrule 10 (i.e., the ferrule 10 before optical fibers 1 are attached) may be shipped and delivered alone.

Next, a process is performed for inserting optical fibers 1 into the respective fiber holes 11 of the ferrule 10 (S003). Usually, a plurality of optical fibers 1 of an optical fiber ribbon will be inserted all together into the respective fiber holes 11 of the ferrule 10. An adhesive may be applied to the fiber holes 11 in advance before insertion of the optical fibers 1.

Next, a process is performed for fixing the optical fibers 1 to the respective fiber holes 11 (S004). In one or more embodiments, the reinforcement member 50 is made of transparent glass, and the resin-molded portion 60 is made of a transparent resin; in a state where a UV-curable resin is applied to the fiber holes 11, the UV-curable resin is irradiated with UV rays through the resin-molded portion 60 and the reinforcement member 50, and thereby, the optical fibers 1 are bonded and fixed to the respective fiber holes 11. Note, however, that a thermoplastic resin may be used instead of a UV-curable resin. In such cases, the reinforcement member 50 and the resin-molded portion 60 do not have to be made of a transparent material (a UV-transmissive material).

Next, the end surface of the ferrule 10 and that of the optical fibers 1 are polished (S005). In this way, a ferrule-equipped optical fiber 1 as illustrated in FIG. 1A is manufactured. Note that the reinforcement member 50 may, or may not, be exposed from the front-side end surface of the ferrule 10 after polishing.

Modified Examples

Figure 4A:
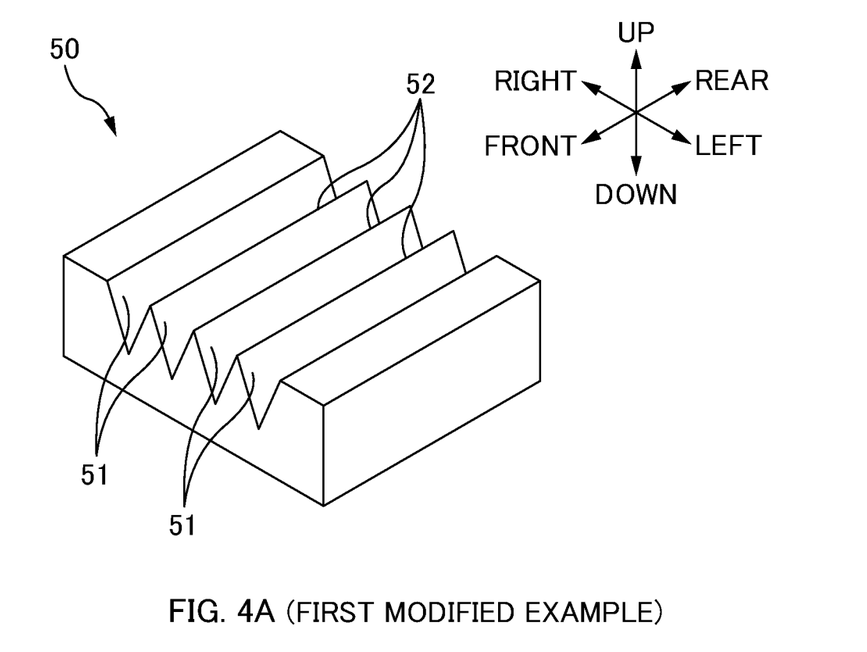
FIG. 4A is a diagram illustrating a first modified example of a reinforcement member 50 to be embedded inside the ferrule 10 of one or more embodiments.
Figure 4B:
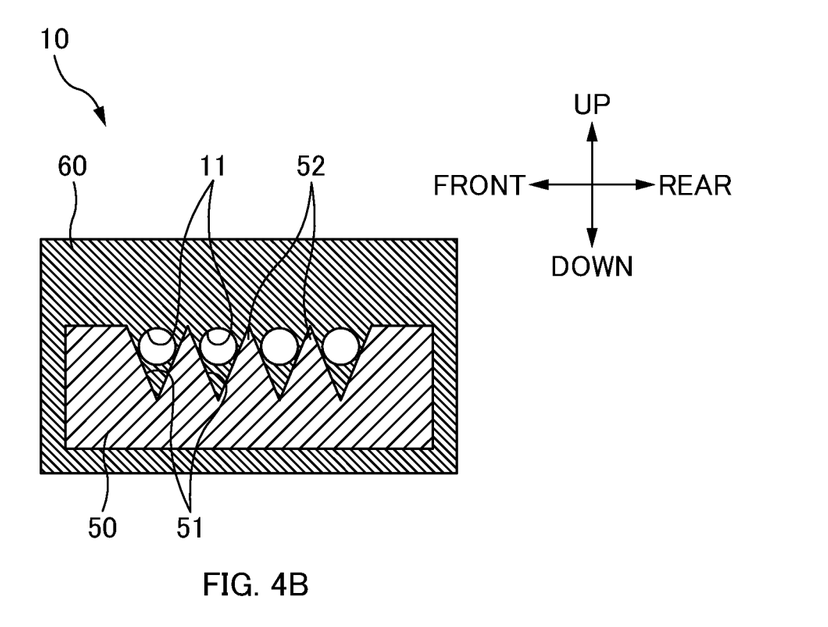
FIG. 4B is a cross-sectional view of the ferrule 10 of the first modified example.

FIG. 4A is a diagram illustrating a first modified example of a reinforcement member 50 to be embedded inside the ferrule 10 of one or more embodiments. FIG. 4B is a cross-sectional view of the ferrule 10 of the first modified example. The fiber insertion portions 51 of the aforementioned reinforcement member 50 were through holes (see FIGS. 1B and 2B). In this first modified example, the fiber insertion portions 51 of the reinforcement member 50 are each formed in a V-groove shape.

Also in this first modified example, the reinforcement member 50 includes a plurality of fiber insertion portions 51. Also in this first modified example, each fiber insertion portion 51 is a section through which the respective optical fiber 1 is inserted. The fiber insertion portions 51 are parallel to the fiber holes 11 and parallel to the front-rear direction. The plurality of fiber insertion portions 51 are parallel to one another and are lined up in the left-right direction.

Also in this first modified example, each fiber hole 11 of the ferrule 10 is formed along the respective fiber insertion portion 51. Also in this first modified example, the fiber holes 11 are constituted by the resin-molded portion 60. More specifically, the fiber holes 11 are formed in the resin-molded portion 60 by the resin entering inside the respective fiber insertion portions 51 having a V-groove shape. Stated differently, also in this first modified example, the inner wall surface of each fiber hole 11 is formed by the resin constituting the resin-molded portion 60. The processing precision in resin molding is higher than the processing precision with respect to materials with low linear expansion coefficients, such as glass. Thus, by forming the fiber holes 11 in the resin-molded portion 60 (i.e., by forming the fiber holes 11 by resin molding), the diameter and positioning of the fiber holes 11 can be set with high accuracy.

In the first modified example, since the fiber insertion portions 51 are formed in a groove shape, the fiber insertion portions 51 can be formed more easily compared to through holes. Further, in the first modified example, since the fiber insertion portions 51 are formed in a groove shape, the resin entering inside the fiber insertion portions 51 (i.e., the resin forming the fiber holes 11) can enter the fiber insertion portions not only from the front-rear direction, but also from above or from the left-right direction. Thus, the configuration of the ferrule 10 of the first modified example allows the use of highly viscous resins for the resin-molded portion 60, thereby widening the range of choices for the resins.

Also in the first modified example in which the fiber insertion portions 51 are formed in a groove shape, the reinforcement member 50 includes partitioning wall portions 52. In cases where the fiber insertion portions 51 are formed in a groove shape, the upper end of each partitioning wall portion 52 is located above the upper edge of the fiber hole 11. In this way, it is possible to further suppress positional misalignment among the fiber holes 11 caused by temperature changes. Note, however, that positional misalignment among the fiber holes 11 can be suppressed even if the upper end of each partitioning wall portion 52 is located below the upper edge of the fiber hole 11.

Figure 5A:
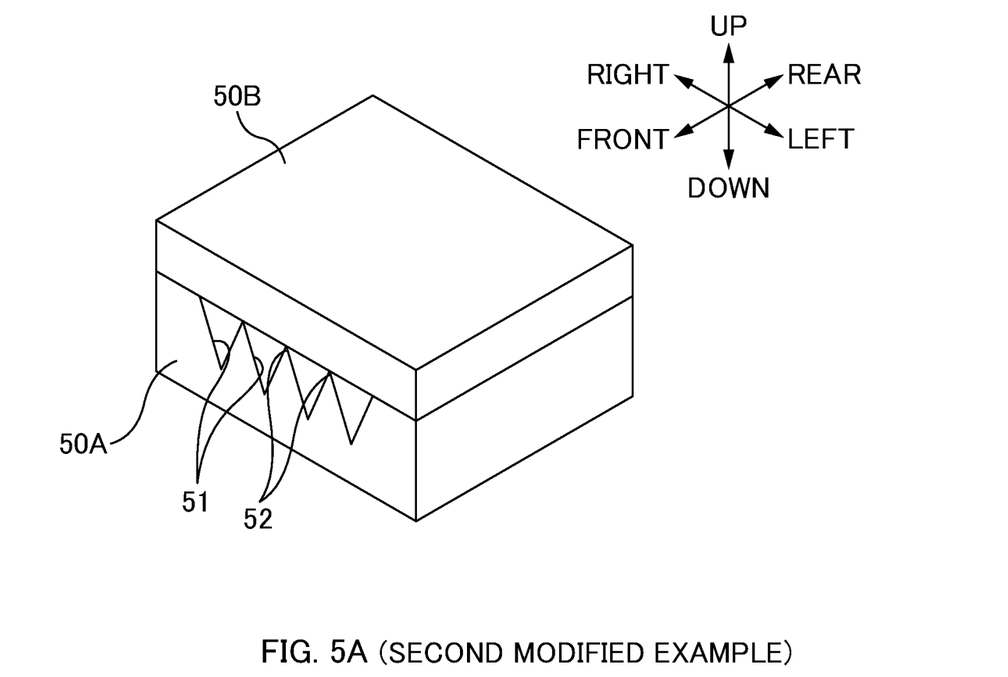
FIG. 5A is a diagram illustrating a second modified example of a reinforcement member 50 to be embedded inside the ferrule 10 of one or more embodiments.
Figure 5B:
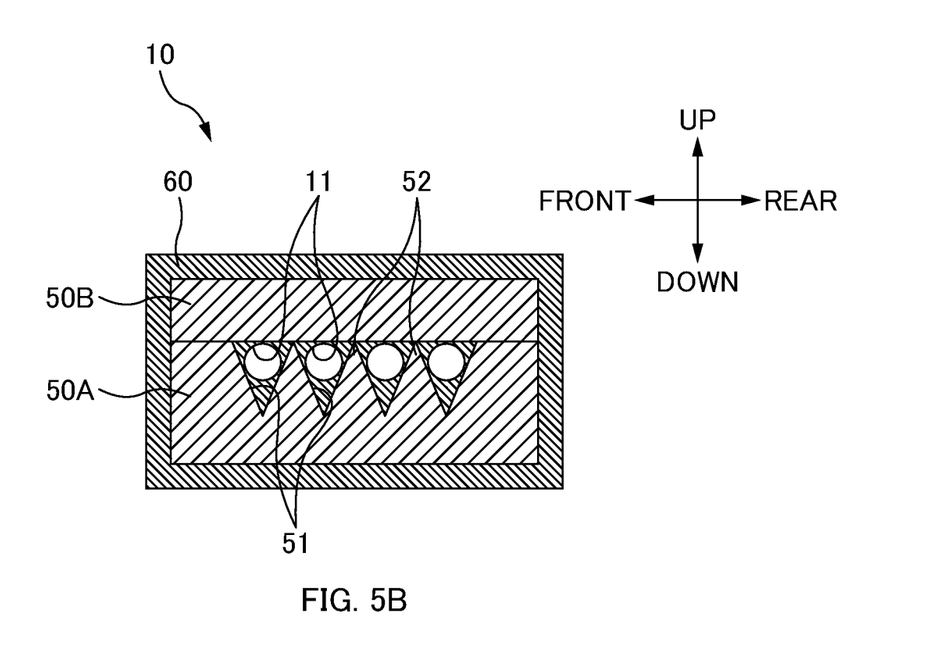
FIG. 5B is a cross-sectional view of the ferrule 10 of the second modified example.

FIG. 5A is a diagram illustrating a second modified example of a reinforcement member 50 to be embedded inside the ferrule 10 of one or more embodiments. FIG. 5B is a cross-sectional view of the ferrule 10 of the second modified example.

The reinforcement member 50 of the second modified example includes a first reinforcing member 50A and a second reinforcing member 50B. Like the reinforcement member 50 of the first modified example, the first reinforcing member 50A includes a plurality of fiber insertion portions 51 having a V-groove shape. The second reinforcing member 50B is a flat-shaped member. Both the first reinforcing member 50A and the second reinforcing member 50B are each made of a material having a low linear expansion coefficient.

In the second modified example, the fiber holes 11 are formed by the resin that has entered inside a region surrounded by the fiber insertion portions 51 in the first reinforcing member 50A and the lower surface of the flat-shaped second reinforcing member 50B. In the aforementioned first modified example, since the reinforcement member 50 is arranged only on the lower side as viewed from the fiber holes 11, the ferrule 10 may deform and warp in cases where the resin constituting the resin-molded portion 60 expands/contracts. In the second modified example, since the reinforcement members 50 with a low linear expansion coefficient are arranged on both the upper and lower sides as viewed from the fiber holes 11, the ferrule 10 can be suppressed from deforming and warping.

Further, in the second modified example, the lower surface of the second reinforcing member 50B is in contact with the upper surface of the first reinforcing member 50A. Stated differently, the second reinforcing member 50B is placed on the upper surface of the first reinforcing member 50A. Thus, the first reinforcing member 50A and the second reinforcing member 50B can be arranged easily in a mold chamber at the time of resin molding.

Figure 6A:
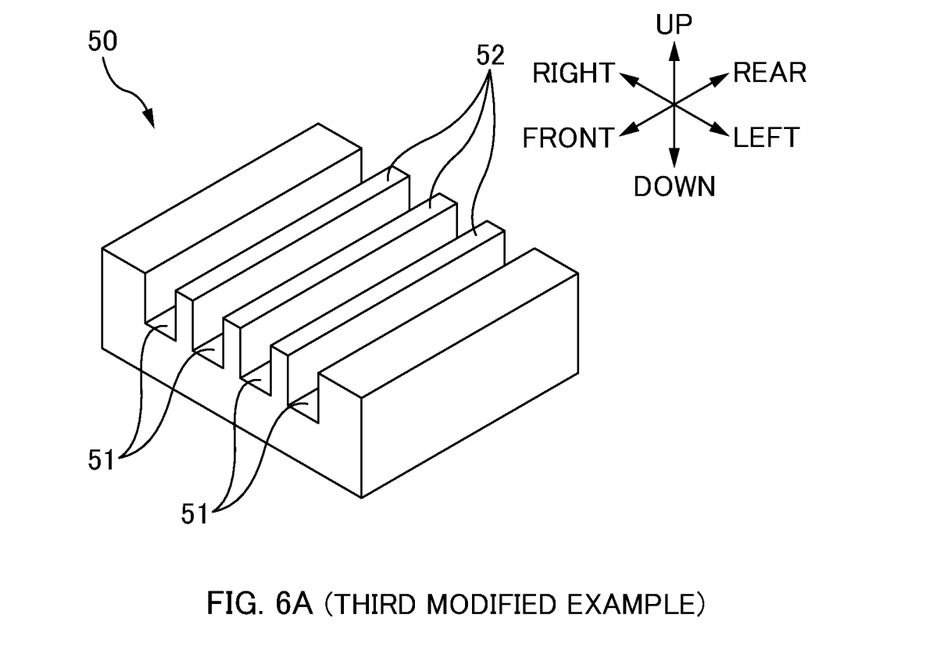
FIG. 6A is a diagram illustrating a third modified example of a reinforcement member 50 to be embedded inside the ferrule 10 of one or more embodiments.
Figure 6B:
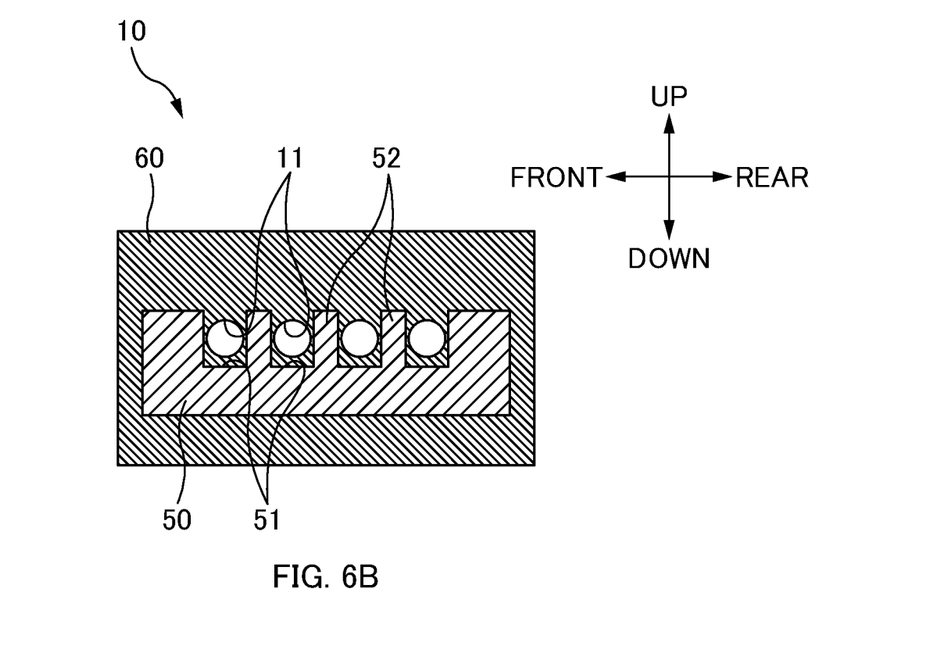
FIG. 6B is a cross-sectional view of the ferrule 10 of the third modified example.

FIG. 6A is a diagram illustrating a third modified example of a reinforcement member 50 to be embedded inside the ferrule 10 of one or more embodiments. FIG. 6B is a cross-sectional view of the ferrule 10 of the third modified example.

In the aforementioned first and second modified examples, the fiber insertion portions 51 are formed in a V-groove shape. In contrast, in the third modified example, each fiber insertion portion 51 is formed in a U-groove shape, and the plurality of fiber insertion portions 51 are formed like the teeth of a comb. In cases of forming the fiber insertion portions 51 of the reinforcement member 50 in a groove shape, the shape of the fiber insertion portions 51 is not limited to a V-groove or U-groove, but may be any other shape. Also in the third modified example, a flat-shaped second reinforcing member 50B may be provided, as in the second modified example.

Figure 7A:
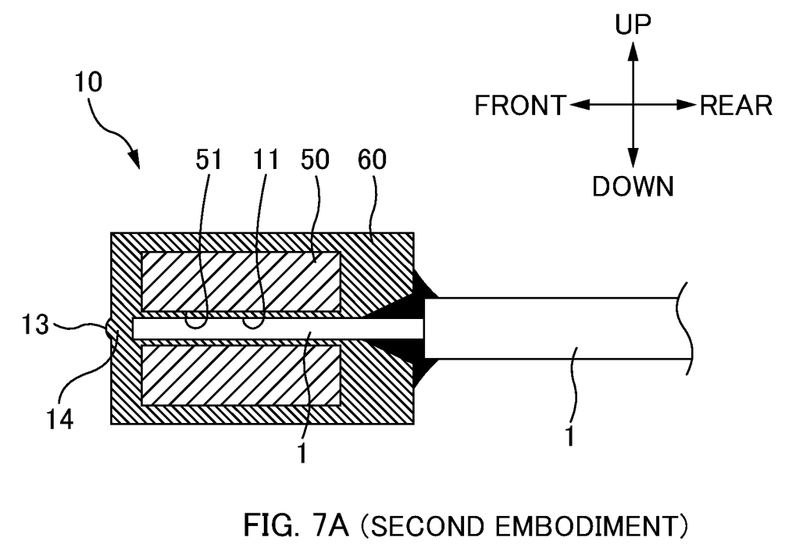
FIG. 7A is a cross-sectional view of a ferrule 10 (ferrule-equipped fiber) according to one or more embodiments.
Figure 7B:
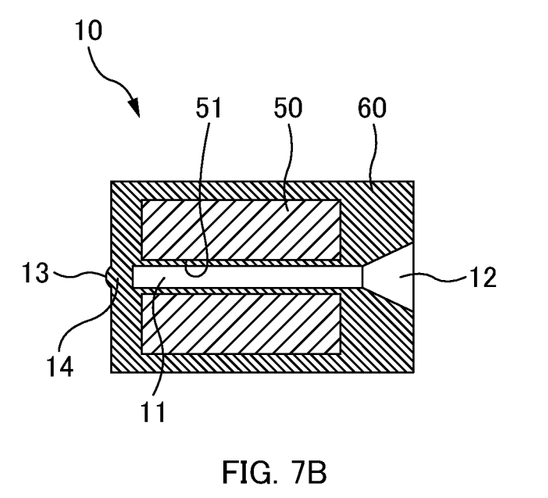
FIG. 7B is a cross-sectional view of the ferrule 10 of the one or more embodiments.

FIG. 7A is a cross-sectional view of a ferrule 10 (ferrule-equipped fiber) according to one or more embodiments. FIG. 7B is a cross-sectional view of the ferrule 10 of one or more embodiments.

The ferrule 10 of one or more embodiments is also a resin-molded article including a reinforcement member 50 embedded therein. Stated differently, the ferrule 10 of one or more embodiments includes a reinforcement member 50, and a resin-molded portion 60 in which the reinforcement member is embedded. Also in one or more embodiments, the reinforcement member 50 is a member having a small linear expansion coefficient, and includes a plurality of fiber insertion portions 51. The fiber insertion portions 51 of the reinforcement member 50 of one or more embodiments are formed as through holes, as illustrated in FIG. 2B. Note, however, that the fiber insertion portions 51 of the reinforcement member 50 of one or more embodiments may be formed in a groove shape, as in the modified examples discussed above.

The ferrule 10 of one or more embodiments includes: a plurality of fiber holes 11; lens portions 13; and a light-transmissive portion 14. These portions are constituted by the resin-molded portion 60. In one or more embodiments, the resin-molded portion 60 is made of a transparent resin that allows optical signals to pass through. This limits the choices of materials for the resin-molded portion 60 in one or more embodiments, and therefore, the resin-molded portion 60 may be made out of a material having a relatively large linear expansion coefficient. In such cases, it is advantageous to provide the reinforcement member 50 in the ferrule 10.

Also in one or more embodiments, each fiber hole 11 is a hole in which the end portion of an optical fiber 1 is inserted, and also serves as a hole for positioning the optical fiber 1. The fiber holes 11 of one or more embodiments are not through holes, but are holes whose front side is closed. Each fiber hole 11 is parallel to the other fiber holes 11, and is parallel to the front-rear direction. The plurality of fiber holes 11, which are parallel to one another, are lined up in the left-right direction (i.e., the direction perpendicular to the paper face of FIG. 7A). The lens portions 13 and the light-transmissive portion 14 are arranged on the front side of the fiber holes 11 of one or more embodiments.

The lens portions 13 are arranged so as to correspond respectively to the plurality of optical fibers 1 (i.e., to the plurality of fiber holes 11). Thus, the ferrule 10 includes a plurality of lens portions 13. Optical signals are inputted/ outputted through the lens portions 13. The lens portion 13 is formed so as to function as a collimating lens, for example. By inputting/outputting optical signals whose diameter has been enlarged by the lens portions 13, negative effects caused, for example, by dust/contamination in the optical path can be reduced, and thus, signal loss can be suppressed.

The light-transmissive portion 14 is a section that allows passage of optical signals between the end surface of the ferrule 10 (more specifically, the lens portions 13) and the end surface of the respective optical fibers 1 (more specifically, the front-side end surface of the respective fiber holes 11). In one or more embodiments, in order to allow passage of optical signals in the light-transmissive portion 14, the resin-molded portion 60 is made of a transparent resin.

Also in one or more embodiments, each fiber hole 11 of the ferrule 10 is formed along the respective fiber insertion portion 51. Also in one or more embodiments, the fiber holes are constituted by the resin-molded portion 60. More specifically, the fiber holes 11 are formed in the resin-molded portion 60 by the resin entering inside the respective fiber insertion portions 51. Stated differently, also in one or more embodiments, the inner wall surface of each fiber hole 11 is formed by the resin constituting the resin-molded portion 60. The processing precision in resin molding is higher than the processing precision with respect to materials with low linear expansion coefficients, such as glass. Thus, by forming the fiber holes 11 in the resin-molded portion 60 (i.e., by forming the fiber holes 11 by resin molding), the diameter and positioning of the fiber holes 11 can be set with high accuracy.

Figure 8A:
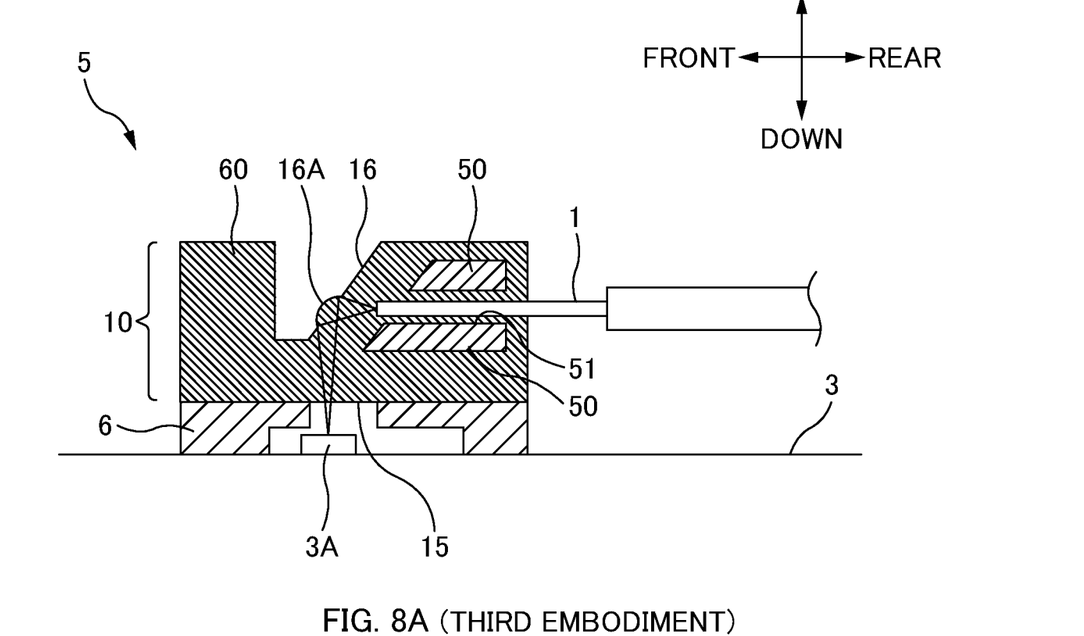
FIG. 8A is a cross-sectional view of an optical connector 5 according to one or more embodiments.
Figure 8B:
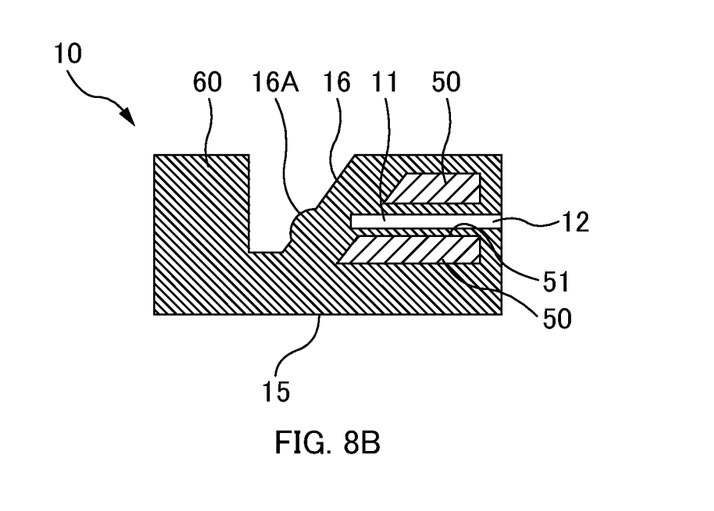
FIG. 8B is a cross-sectional view of a ferrule 10 of one or more embodiments.

FIG. 8A is a cross-sectional view of an optical connector 5 according to a third embodiment. FIG. 8B is a cross-sectional view of a ferrule 10 of one or more embodiments. The optical connector 5 of one or more embodiments includes a ferrule 10 and a receptacle 6. The receptacle 6 is a member for fixing the ferrule 10 with respect to a substrate 3.

The ferrule 10 is a member that retains the end portion of each optical fiber 1. The ferrule 10 of one or more embodiments is also a resin-molded article including a reinforcement member 50 embedded therein. Stated differently, the ferrule 10 of one or more embodiments includes a reinforcement member 50, and a resin-molded portion 60 in which the reinforcement member 50 is embedded. Also in one or more embodiments, the reinforcement member 50 is a member having a small linear expansion coefficient, and includes a plurality of fiber insertion portions 51. The fiber insertion portions 51 are parallel to the fiber holes 11 and parallel to the front-rear direction. The plurality of fiber insertion portions 51 are parallel to one another and are lined up in the left-right direction. Further, partitioning wall portions 52 (not illustrated in FIGS. 8A and 8B) are formed between the fiber insertion portions 51, 51. In this example, the fiber insertion portions 51 are through holes, but they may be formed in a groove shape, as in the modified examples of one or more embodiments.

The ferrule 10 of one or more embodiments includes: a plurality of fiber holes 11; an optical signal surface 15; and a reflection surface 16. These portions are constituted by the resin-molded portion 60. In one or more embodiments, the resin-molded portion 60 is made of a transparent resin that allows optical signals to pass through. This limits the choices of materials for the resin-molded portion 60 in one or more embodiments, and therefore, the resin-molded portion 60 may be made out of a material having a relatively large linear expansion coefficient. In such cases, it is advantageous to provide the reinforcement member 50 in the ferrule 10.

Also in one or more embodiments, each fiber hole 11 is a hole in which the end portion of an optical fiber 1 is inserted, and also serves as a hole for positioning the optical fiber 1. Like the fiber holes 11 of one or more embodiments discussed above, the fiber holes 11 of one or more embodiments discussed below are not through holes, but are holes whose front side is closed. Each fiber hole 11 is parallel to the front-rear direction. The plurality of fiber holes 11, which are parallel to one another, are lined up in the left-right direction (i.e., the direction perpendicular to the paper face of FIG. 8A). The reflection surface 16 (as well as lens portions 16A provided to the reflection surface 16) is arranged on the front side of the fiber holes 11 of one or more embodiments.

The optical signal surface 15 is a surface where optical signals are incident and emitted, and is a surface opposing an optical element 3A (light-emitting element or light-receiving element). A plurality of optical signals are incident on or emitted from the optical signal surface 15. When the ferrule 10 is positioned with respect to the receptacle 6, the optical signal surface 15 of the ferrule 10 comes into opposition with an opening of the receptacle 6, and thus comes into opposition with the upper surface (the surface where optical signals are incident or emitted) of the optical element 3A of the substrate 3. The optical signal surface 15 is formed parallel to the left-right direction (i.e., the direction perpendicular to the paper face of FIG. 8A). A plurality of lenses may be formed along the left-right direction of the optical signal surface 15.

The reflection surface 16 is a surface that reflects optical signals. The reflection surface 16 is a sloped surface arranged on the front side of the end surface of the optical fibers 1. By providing the reflection surface 16 to the ferrule 10, it is possible to change the optical path of the optical signals within the ferrule 10. The upper surface of the ferrule 10 is provided with a recess, and the sloped surface on the rear side of the recess serves as the reflection surface 16. The reflection surface 16 is formed parallel to the left-right direction (i.e., the direction in which the plurality of optical fibers 1 are lined up).

In one or more embodiments, lens portions 16A are formed on the reflection surface 16. The lens portions 16A are arranged so as to correspond respectively to the plurality of optical fibers 1 (i.e., to the plurality of fiber holes 11). Thus, the ferrule 10 includes a plurality of lens portions 16A. Note, however, that the reflection surface 16 does not have to include the lens portions 16A, and instead the reflection surface 16 may be flat.

In one or more embodiments, the front-side end surface of the reinforcement member 50 (i.e., the end surface on the reflection surface 16 side) is a sloped surface that is sloped in the same direction as the reflection surface 16. Stated differently, the front-side end surface of the reinforcement member 50 is formed substantially parallel to the reflection surface 16. More specifically, the reflection surface 16 is sloped such that its lower side (the substrate 3 side) is located more toward the front side (i.e., the opposite side from the side toward which the optical fibers 1 extend out from the ferrule 10), and also, the front-side end surface of the reinforcement member 50 is sloped such that its lower side is located more toward the front side. In this way, the front-side end surface of the reinforcement member 50 can be arranged close to the reflection surface 16. As a result, it is possible to suppress positional misalignment among the optical fibers 1 at the end surface of the respective optical fibers 1, and also, in cases where lens portions 16A are provided on the reflection surface 16, it is possible to suppress positional misalignment among the lens portions 16A as well.

In cases where an optical signal has been emitted from the end surface of each optical fiber 1, the optical signal is reflected by the reflection surface 16 (more specifically, the lens portion 16A), and is emitted from the optical signal surface 15 toward the optical element 3A (light-receiving element). In cases where an optical signal is incident on the optical signal surface 15 from the optical element 3A (light-emitting element), the optical signal is reflected by the reflection surface 16 (more specifically, the lens portion 16A), and is incident on the end surface of the optical fiber 1.

Also in one or more embodiments, each fiber hole 11 of the ferrule 10 is formed along the respective fiber insertion portion 51. Also in one or more embodiments, the fiber holes are constituted by the resin-molded portion 60. More specifically, the fiber holes 11 are formed in the resin-molded portion 60 by the resin entering inside the respective fiber insertion portions 51. Stated differently, also in one or more embodiments, the inner wall surface of each fiber hole 11 is formed by the resin constituting the resin-molded portion 60. The processing precision in resin molding is higher than the processing precision with respect to materials with low linear expansion coefficients, such as glass. Thus, by forming the fiber holes 11 in the resin-molded portion 60 (i.e., by forming the fiber holes 11 by resin molding), the diameter and positioning of the fiber holes 11 can be set with high accuracy.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical fiber;
3: Substrate;
3A: Optical element;
5: Optical connector;
6: Receptacle;
10: Ferrule;
11: Fiber hole;
12: Fiber insertion opening;
13: Lens portion;
14: Light-transmissive portion;
15: Optical signal surface;
16: Reflection surface;
16A: Lens portion;
50: Reinforcement member;
50A: First reinforcing member;
50B: Second reinforcing member;
51: Fiber insertion portion;
52: Partitioning wall portion;
60: Resin-molded portion.

The invention claimed is:
1. A ferrule having fiber holes, the ferrule comprising:
a resin-molded portion molded by a resin; and
a reinforcement member embedded in the resin-molded portion and that has a smaller linear expansion coefficient than the resin-molded portion, wherein the reinforcement member includes fiber insertion portions, each of the fiber insertion portions is a through hole surrounding one fiber hole, and each of the fiber holes and a corresponding one of the fiber insertion portions are separated by the resin such that a diameter of each of the fiber holes is smaller than a diameter of a corresponding one of the fiber insertion portions.

2. The ferrule according to claim 1, wherein the resin-molded portion comprises a plurality of lens portions.

3. The ferrule according to claim 1, wherein the resin-molded portion comprises a reflection surface.

4. The ferrule according to claim 3, wherein:

the reflection surface is sloped with respect to a direction of the fiber holes; and an end surface of the reinforcement member on the reflection surface side of the resin-molded portion is sloped in the same direction as the reflection surface.

5. The ferrule according to claim 1, wherein the resin-molded portion and the reinforcement member comprise UV-transmissive material.

6. An optical-fiber-equipped ferrule comprising:

a ferrule having fiber holes; and optical fibers inserted in the respective fiber holes, wherein:

the ferrule includes:

a resin-molded portion molded by a resin; and a reinforcement member embedded in the resin-molded portion and that has a smaller linear expansion coefficient than the resin-molded portion, the reinforcement member includes fiber insertion portions, each of the fiber insertion portions is a through hole surrounding one fiber hole, and each of the fiber holes and a corresponding one of the fiber insertion portions are separated by the resin such that a diameter of each of the fiber holes is smaller than a diameter of a corresponding one of the fiber insertion portions.

* * * * *